United States Patent
Zimmerman et al.

(10) Patent No.: US 11,605,819 B2
(45) Date of Patent: Mar. 14, 2023

(54) BATTERY HAVING ALUMINUM ANODE AND SOLID POLYMER ELECTROLYTE

(71) Applicant: IONIC MATERIALS, INC., Woburn, MA (US)

(72) Inventors: Michael A. Zimmerman, North Andover, MA (US); Alexei B. Gavrilov, Woburn, MA (US); Ting Liu, Wilmington, MA (US); Keith Smith, Methuen, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 0 days.

(21) Appl. No.: 15/580,428

(22) PCT Filed: Jun. 7, 2016

(86) PCT No.: PCT/US2016/036176
§ 371 (c)(1),
(2) Date: Dec. 7, 2017

(87) PCT Pub. No.: WO2016/200785
PCT Pub. Date: Dec. 15, 2016

(65) Prior Publication Data
US 2018/0175372 A1    Jun. 21, 2018

Related U.S. Application Data

(60) Provisional application No. 62/172,467, filed on Jun. 8, 2015.

(51) Int. Cl.
*H01M 4/60* (2006.01)
*H01M 10/054* (2010.01)
(Continued)

(52) U.S. Cl.
CPC .......... *H01M 4/602* (2013.01); *H01M 4/131* (2013.01); *H01M 4/134* (2013.01); *H01M 4/136* (2013.01);
(Continued)

(58) Field of Classification Search
CPC .. H01M 10/0562; H01M 4/134; H01M 4/463; H01M 4/466
See application file for complete search history.

(56) References Cited

U.S. PATENT DOCUMENTS 2,638,489 A    5/1953   Ruben
3,257,241 A *  6/1966   Tamminen ............ H01M 2/40
                                                     429/70
(Continued)

FOREIGN PATENT DOCUMENTS

CN    1285086 A    2/2001
CN    1326596 C   12/2001
(Continued)

OTHER PUBLICATIONS

Wu, et al., Journal of Membrane Science, 2006, 280, 802-808 (Year: 2006).*

(Continued)

*Primary Examiner* — Sadie White
(74) *Attorney, Agent, or Firm* — Burns & Levinson LLP; Joseph M. Maraia; Joseph P. Quinn (57) ABSTRACT

A battery, having polyvalent aluminum metal as the electrochemically active anode material and also including a solid ionically conducting polymer material.

52 Claims, 2 Drawing Sheets

(51) Int. Cl.
*H01M 10/0565* (2010.01)
*H01M 4/46* (2006.01)
*H01M 10/24* (2006.01)
*H01M 4/62* (2006.01)
*H01M 4/131* (2010.01)
*H01M 4/38* (2006.01)
*H01M 4/50* (2010.01)
*H01M 4/134* (2010.01)
*H01M 4/136* (2010.01)
*H01M 4/1395* (2010.01)
*H01M 4/1399* (2010.01)
*H01M 10/0562* (2010.01)
*H01M 4/02* (2006.01)

(52) U.S. Cl.
CPC ....... *H01M 4/1395* (2013.01); *H01M 4/1399* (2013.01); *H01M 4/381* (2013.01); *H01M 4/463* (2013.01); *H01M 4/466* (2013.01); *H01M 4/50* (2013.01); *H01M 4/624* (2013.01); *H01M 10/054* (2013.01); *H01M 10/0562* (2013.01); *H01M 10/0565* (2013.01); *H01M 10/24* (2013.01); *H01M 2004/027* (2013.01); *H01M 2004/028* (2013.01); *H01M 2300/0082* (2013.01)

(56) References Cited

U.S. PATENT DOCUMENTS

| | | | |
|---|---|---|---|
| 3,336,279 A | 8/1967 | Scott | |
| 3,502,606 A | 3/1970 | Conciatori et al. | |
| 4,243,732 A | 1/1981 | Powers et al. | |
| 4,465,744 A | 8/1984 | Susman et al. | |
| 4,720,910 A | 1/1988 | Rourke et al. | |
| 4,804,594 A | 2/1989 | Jow et al. | |
| 4,925,751 A | 5/1990 | Shackle et al. | |
| 5,147,739 A | 9/1992 | Beard | |
| 5,160,880 A | 11/1992 | Palanisamy | |
| 5,213,860 A * | 5/1993 | Laing .................. A61J 1/065 215/253 | |
| 5,227,043 A | 7/1993 | Shakushiro et al. | |
| 5,270,137 A | 12/1993 | Kubota | |
| 5,378,560 A | 1/1995 | Tomiyama | |
| 5,403,675 A | 4/1995 | Ogata et al. | |
| 5,424,151 A | 6/1995 | Koksbang et al. | |
| 5,462,566 A | 10/1995 | Skotheim | |
| 5,506,073 A | 4/1996 | Angell et al. | |
| 5,582,937 A | 12/1996 | LaFollette | |
| 5,599,355 A | 2/1997 | Nagasubramanian et al. | |
| 5,620,811 A | 4/1997 | Zhang et al. | |
| 5,648,187 A | 7/1997 | Skotheim | |
| 5,660,953 A | 8/1997 | Bai et al. | |
| 5,669,559 A | 9/1997 | Wagner et al. | |
| 5,688,613 A | 11/1997 | Li et al. | |
| 5,713,169 A * | 2/1998 | Meier .................. E04C 5/122 52/223.13 | |
| 5,888,672 A | 3/1999 | Gustafson et al. | |
| 5,917,693 A * | 6/1999 | Kono .................. H01G 9/025 361/525 | |
| 5,989,742 A * | 11/1999 | Cabasso .................. C08J 5/2256 429/493 | |
| 6,074,773 A | 6/2000 | Wilkinson et al. | |
| 6,110,619 A | 8/2000 | Zhang et al. | |
| 6,183,914 B1 | 2/2001 | Yao et al. | |
| 6,248,474 B1 | 6/2001 | Nishiyama et al. | |
| 6,274,261 B1 | 8/2001 | Tinker et al. | |
| 6,274,681 B1 | 8/2001 | Inagaki et al. | |
| 6,358,651 B1 | 3/2002 | Chen et al. | |
| 6,376,123 B1 | 4/2002 | Chu | |
| 6,413,676 B1 * | 7/2002 | Munshi .................. H01M 4/131 429/303 | |
| 6,451,487 B1 | 9/2002 | Besner et al. | |
| 6,455,202 B1 | 9/2002 | Marugan et al. | |
| 6,461,724 B1 | 10/2002 | Radovanovic et al. | |
| 6,630,271 B1 | 10/2003 | Arcella et al. | |
| 6,645,675 B1 | 11/2003 | Munshi | |
| 6,652,440 B1 | 11/2003 | Kovalev et al. | |
| 6,727,343 B2 | 4/2004 | Morris et al. | |
| 7,070,882 B1 * | 7/2006 | Ferrando .................. H01M 4/36 252/182.1 | |
| 7,455,935 B2 | 11/2008 | Abe et al. | |
| 7,651,647 B1 | 1/2010 | Strange et al. | |
| 8,227,105 B1 * | 7/2012 | Gerald, II .................. H01M 2/1646 29/623.5 | |
| 8,753,594 B1 * | 6/2014 | Burba, III .................. C01D 15/00 423/179.5 | |
| 8,877,376 B2 | 11/2014 | Wakizaka et al. | |
| 8,906,556 B2 | 12/2014 | Hambitzer | |
| 8,945,432 B2 | 2/2015 | Towns et al. | |
| 9,742,008 B2 | 8/2017 | Zimmerman et al. | |
| 9,819,053 B1 | 11/2017 | Zimmerman | |
| 10,553,901 B2 | 2/2020 | Zimmerman et al. | |
| 2001/0003863 A1 | 6/2001 | Thibault et al. | |
| 2002/0010261 A1 | 1/2002 | Callahan et al. | |
| 2002/0048706 A1 | 4/2002 | Mayes et al. | |
| 2002/0177043 A1 | 11/2002 | Ndzebet et al. | |
| 2003/0013012 A1 | 1/2003 | Ahn et al. | |
| 2003/0069343 A1 | 4/2003 | Smith et al. | |
| 2003/0138702 A1 * | 7/2003 | Gerald, II .................. H01M 2/16 429/307 | |
| 2003/0162087 A1 | 8/2003 | Clarke et al. | |
| 2003/0209692 A1 | 11/2003 | Farrand et al. | |
| 2004/0023116 A1 | 2/2004 | Fujino et al. | |
| 2004/0076881 A1 | 4/2004 | Bowden et al. | |
| 2004/0157101 A1 | 8/2004 | Smedley | |
| 2004/0229118 A1 | 11/2004 | Wensley et al. | |
| 2004/0241553 A1 | 12/2004 | Abe et al. | |
| 2005/0019661 A1 | 1/2005 | Han et al. | |
| 2005/0112471 A1 | 5/2005 | Chen et al. | |
| 2005/0164085 A1 | 7/2005 | Bofinger et al. | |
| 2005/0181280 A1 | 8/2005 | Ceder et al. | |
| 2005/0244696 A1 | 11/2005 | Kuromatsu et al. | |
| 2005/0287441 A1 | 12/2005 | Passerini et al. | |
| 2006/0004112 A1 | 1/2006 | Shimoyama et al. | |
| 2006/0166085 A1 | 7/2006 | Hennige et al. | |
| 2006/0269834 A1 | 11/2006 | West et al. | |
| 2007/0015047 A1 | 1/2007 | Hosaka et al. | |
| 2007/0020525 A1 | 1/2007 | Kim et al. | |
| 2007/0051366 A1 | 3/2007 | Hansmann et al. | |
| 2007/0166618 A1 | 7/2007 | Armand et al. | |
| 2007/0250036 A1 | 10/2007 | Volk et al. | |
| 2008/0066297 A1 | 3/2008 | Lin et al. | |
| 2008/0090138 A1 | 4/2008 | Vu et al. | |
| 2008/0118826 A1 | 5/2008 | Shimamura et al. | |
| 2008/0199755 A1 | 8/2008 | Brotherston et al. | |
| 2008/0248356 A1 | 10/2008 | Kimura et al. | |
| 2008/0292953 A1 | 11/2008 | Hosaka et al. | |
| 2008/0300380 A1 | 12/2008 | Bai et al. | |
| 2009/0087721 A1 * | 4/2009 | Yoshida .................. H01M 4/926 429/422 | |
| 2009/0162755 A1 | 6/2009 | Neudecker | |
| 2009/0197183 A1 | 8/2009 | Kato | |
| 2009/0246636 A1 | 10/2009 | Chiang et al. | |
| 2009/0272731 A1 | 11/2009 | Olding et al. | |
| 2010/0227224 A1 | 9/2010 | Eitouni et al. | |
| 2011/0020708 A1 | 1/2011 | Fujiki et al. | |
| 2011/0027666 A1 * | 2/2011 | Burchardt .................. H01M 2/1653 429/406 | |
| 2011/0070487 A1 | 3/2011 | Padhi et al. | |
| 2011/0104511 A1 | 5/2011 | Okumura et al. | |
| 2011/0104571 A1 | 5/2011 | Zhamu et al. | |
| 2011/0111287 A1 * | 5/2011 | Sayre .................. H01M 4/9016 429/199 | |
| 2011/0204341 A1 | 8/2011 | Brown et al. | |
| 2011/0223477 A1 * | 9/2011 | Nelson .................. H01M 4/364 429/206 | |
| 2011/0223518 A1 * | 9/2011 | Hirakimoto .......... H01M 4/881 429/482 | |
| 2011/0274983 A1 | 11/2011 | Yontz et al. | |
| 2011/0274990 A1 | 11/2011 | Xu | |
| 2011/0281158 A1 | 11/2011 | Tazoe | |

(56) References Cited

U.S. PATENT DOCUMENTS

| | | |
|---|---|---|
| 2011/0281159 A1 | 11/2011 | Farmer et al. |
| 2011/0318646 A1 | 12/2011 | Babinec et al. |
| 2012/0082905 A1* | 4/2012 | Brown ............... H01M 4/50 429/188 |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 | 7/2012 | Wakizaka et al. |
| 2012/0208091 A1* | 8/2012 | Tsai ............... H01M 10/0565 429/307 |
| 2012/0231355 A1 | 9/2012 | Lee et al. |
| 2012/0251897 A1* | 10/2012 | Yager ............... H01M 12/06 429/406 |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1* | 6/2013 | Hsieh ............... H01G 9/0036 427/80 |
| 2013/0189589 A1 | 7/2013 | Hashaikeh et al. |
| 2013/0216936 A1 | 8/2013 | Fuchs et al. |
| 2014/0004431 A1* | 1/2014 | Yamaguchi ........... H01M 12/06 429/405 |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0068069 A1* | 3/2015 | Tran ............... A43B 13/183 36/136 |
| 2015/0146452 A1* | 5/2015 | Kim ............... C09K 11/883 362/611 |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera et al. |
| 2016/0365553 A1* | 12/2016 | Kountz ............... H01M 2/02 |
| 2017/0005343 A1* | 1/2017 | Rodriguez Soler ..... H01M 4/50 |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0212232 A1 | 7/2018 | Zimmerman et al. |
| 2018/0219210 A1 | 8/2018 | Kim |
| 2018/0241031 A1 | 8/2018 | Pan et al. |
| 2019/0067764 A1 | 2/2019 | Zimmerman et al. |

FOREIGN PATENT DOCUMENTS

| | | |
|---|---|---|
| CN | 1354529 C | 6/2002 |
| CN | 1457518 C | 11/2003 |
| CN | 1592937 A | 3/2005 |
| CN | 1965436 A | 5/2007 |
| CN | 101290985 A | 10/2008 |
| JP | 59-157151 A | 9/1984 |
| JP | 04-267055 A | 9/1992 |
| JP | 9-219197 A | 8/1997 |
| JP | 2002/352799 A | 12/2002 |
| JP | 2002/358959 A | 12/2002 |
| JP | 2003/242964 A | 8/2003 |
| JP | 2004-265675 A | 9/2004 |
| JP | 2005/535076 A | 11/2005 |
| JP | 2006/049122 A | 2/2006 |
| JP | 2006-210089 A | 8/2006 |
| JP | 2007-080642 A1 | 3/2007 |
| JP | 2010/509719 A | 3/2010 |
| JP | 2011-28976 A | 2/2011 |
| JP | 2012/517519 B2 | 8/2012 |
| JP | 2014-067638 A | 4/2014 |
| JP | 2014-112560 A | 6/2014 |
| KR | 10-2008-0023294 A | 3/2008 |
| KR | 10-2011-0106342 A | 9/2011 |
| KR | 10-2012-0117853 A | 10/2012 |
| WO | 1998/42037 A1 | 9/1998 |
| WO | 1999/33127 A1 | 7/1999 |
| WO | 2001/17051 A1 | 3/2001 |
| WO | 2001/026175 A1 | 4/2001 |
| WO | 2004/027909 A1 | 4/2004 |
| WO | 2006/019064 A2 | 2/2006 |
| WO | 2011/146670 A1 | 11/2011 |
| WO | 2014/020349 A1 | 2/2014 |
| WO | 2015/084940 A1 | 6/2015 |
| WO | 2015/153729 A1 | 10/2015 |
| WO | 2016/196873 A1 | 12/2016 |
| WO | 2016/197098 A1 | 12/2016 |
| WO | 2019/065066 A1 | 4/2019 |

OTHER PUBLICATIONS

Zhang, et al., Journal of Power Sources, 2014, 251, 470-475 (Year: 2014).*
Moharram, et al., Journal of Applied Polymer Science, 1998, vol. 68, pp. 2049-2055 (Year: 1998).*
Yang, et al., Journal of Power Sources, 2002, vol. 112, pp. 497-503 (Year: 2002).*
Yang, Journal of Power Sources, 2002, vol. 109, pp. 22-31 (Year: 2002).*
Wu, et al., Journal of Power Sources, 2013, vol. 244, pp. 287-293 (Year: 2013).*
Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_TSP-07_Issue3.pdf>. entire document.
Candlin, J. "Polymers" within "The Chemical Industry: Second Edition." Edited by Alan Heaton. 1994. Spring Science+Business Media Dordrecht, pp. 116-121.
Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.
Definition of Dopant. http://www.merriam-webster.com/dictionary/dopant. Downloaded Feb. 4, 2019.
Definition of Nonflammable. http://www.dictionary.com/browse/nonflammable?s=t. As viewed on Jun. 7, 2016.
Edman, L. et al., "Transport properties of the Solid Polymer Electrolyte System P(EO)nLiTFSI," Journal of Physical Chemistry B, 2000; vol. 104, No. 15, pp. 3476-3480.
Ferrando, W.A., "Development of a Novel Composite Aluminum Anode," Journal of Power Sources, vol. 130, Issues 102, pp. 309-314, May 2004. Abstract only.
Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.
Kösters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.
Lefrou, C. et al., "Electrochemistry: The Basics, With Examples." Springer-Verlag Berlin Heidelberg, pp. 22-25, 2012.
Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.
Liew, C.-W. et al., "Characterization of ionic liquid added poly(vinyl alcohol)-based proton conducting polymer electrolytes and (56) References Cited

OTHER PUBLICATIONS electrochemical studies on the supercapacitors," International Journal of Hydrogen Energy, vol. 40, pp. 852-862, 2015.
Miyatake, K. et al., "Synthesis of poly(phenylene sulfide sulfonic acid) via poly(sulfoniumcation) as a thermostable proton-conducting polymer," Macromolecules, vol. 29, pp. 6969-6971, 1996.
OPI Online Courses, "Insulator, Semiconductor Conductor," (online), Jul. 1, 2012.
Polyphenylene Sulfide Information. DIC Corporation. http://www.dic-global.com/us/en/products/pps/about.html. Downloaded on Jun. 8, 2016.
Polystyrene, Wikipedia. https://en.wikipedia.org/wiki/Polystyrene. Downloaded Feb. 4, 2019.
Sandor, R.B., "PBI (Polybenzimidazole): Synthesis, Properties and Applications," High Performance Polymers, vol. 2, No. 1, pp. 25-37, 1990.
Sannigrahi, A. et al., "Tuning the Molecular Properties of Polybenzimidazole by Copolymerization," Journal of Physical Chemistry B, vol. 111, pp. 12124-12132, 2007.
Santhosh, P. et al., "Preparation and properties of new cross-linked polyurethane acrylate electrolytes for lithium batteries," Journal of Power Sources 160, pp. 609-620, 2006.
Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage= 111775702>. entire document.
Solvay. Ryton PPS. Feb. 7, 2015 (Feb. 7, 2015) [retrieved on Aug. 9, 2016]. Retrieved from the Internet: <URL: http://www.solvay.com/en/markets-and-products/featured-products/Ryton-PPS.htmlf>. entire document.
Teng, H., "Overview of the development of the fluoropolymer Industry," Applied Sciences, 2012, vol. 2, pp. 496-512.
Tokito et al. Electrical Conductivity and Optical Properties of Poly(p-phenylene sulfide) doped with Some Organic Acceptors. Polymer Journal, vol. 17, No. 8, pp. 959-968.1985. Retrieved from the Internet<URL:HTTP://www.nature.com/pj/journal/v17/n8/pdf/pj 1985103a.pdf.> entire document.
Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, 2008.
Translated Text of the First Office Action, dated Aug. 7, 2018, from related Chinese Patent Application No. 2015/80018411.6.
Supplementary European Search Report, dated Apr. 5, 2017, from related European Patent Application No. 14868257, filed Dec. 3, 2014.
Extended European Search Report, dated Oct. 8, 2018, from related European Patent Application No. 16804487.3, filed on Jan. 4, 2018.
Extended European Search Report, dated Oct. 5, 2018, from related European Patent Application No. 16804636.5, filed on Jan. 4, 2018.
Supplementary European Search Report, dated Oct. 15, 2018, from related European Patent Application No. 16808165.1, filed on Jun. 8, 2016.
International Search Report and the Written Opinion of the International Searching Authority, dated Apr. 5, 2018 from related PCT/US2018/015146 filed on Jan. 25, 2018.
Written Opinion of the Singapore Intellectual Property Office, dated Jul. 31, 2018, from related Singapore Patent Application No. SG2018/4525517527Y.
Extended European Search Report, dated Dec. 13, 2018, from counterpart European Patent Application No. 16808115.6, filed on Jun. 7, 2016.
Ferrando, W.A. "Development of a novel composite aluminum anode," Journal of Power Sources, vol. 130, Issue 1, pp. 309-314. (May 3, 2004).
Ahmad et al., Structural studies and ionic conductivity of lithium iodide-lithium tungstate solid electrolytes. Ionics, 2002, 8, 433-438 (2002).

Celazole® T-Series: Injection Molding Thermoplastic Polymers. Brochure of PBI Performance Products, Inc., 2013.
Gal'Perin et al., Determination of the crystallinity of polyvinylidene fluoride. Polymer Science: USSR 1970, 12, 2133-2139 (1970).
Lee et al., PVDF-based nanocomposite solid polymer electrolytes; the effect of affinity between PVDF and filler on ionic conductivity. Composite Interfaces 2009, 16, 347-358.
Lithium Iodide Information. ChemBook. http://www.chemicalbook.com/ChemicalProductProperty_EN_cb8688141.htm. As viewed on Apr. 25, 2017.
PBI Information. Polymers: A Property Database 2017, CRC Press, Taylor & Francis Group (2017).
Polyacrylonitrile Information. ChemicalBook. http://www.chemicalbook.com/ChemicalProductProperty_USCB9199592.aspx. As viewed on Jan. 18, 2018.
Polymer Density Table. ScientificPolymer. http://scientificpolymer.com/density-of-polymers-by-density/. As viewed on Mar. 11, 2015.
Polyvinylidenefluoride (PVDF) Information, Goodfellow, http://www.goodfellow.eom/E/Polyvinylidenefluoride.html. As viewed on Jan. 18, 2018.
Spry, R.J. et al., Anisotropic Ionic Conductivity of Lithium-Doped Sulfonated PBI, Journal of Polymer Science: Part B: Polymer Physics, 35, 2925-2933 (1997).
Suib, S.L., New and future developments in catalysis: Batteries, Hydrogen Storage and Fuel Cells. Elsevier B.V. Jul. 29, 2013, pp. 1-16.
Extended European Search Report, dated Oct. 9, 2018, from related European Application No. EP 16804233, filed on Jan. 2, 2018.
International Search Report and the Written Opinion of the International Search Authority, dated Apr. 5, 2017, from related PCT/US2014/068338, filed on Dec. 3, 2014.
International Search Report and the Written Opinion of the International Search Authority, dated Oct. 26, 2016, from related PCT/US2016/035040, filed on May 31, 2016.
Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.
Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with the translator signature is attached.
Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.
Wu, Y., ed., "Lithium Ion Battery Application and Practice," Chapter 11: Solid Electrolyte. Chinese; cited in Third Office Action for CN 2015/80018411.6. Art is summarized in the attached foreign Office Action citing the art, and a translation of the summary with the translator signature is attached.
Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_Selected_Apps_EN.pdf.
Imrie, C.T. et al., "Ion Transport in Glassy Polymer Electrolytes," Journal of Physical Chemistry B, vol. 103, pp. 4132-4138, 1999.
Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.
Taib, N. U. et al., "Plastic crystal-solid biopolymer electrolytes for rechargeable lithium batteries," Journal of Membrane Science, vol. 468, pp. 149-154, 2014.
Brady, D.G. "The crystallinity of poly(phenylene sulfide) and its effect on polymer properties." Journal of Applied Polymer Science, 1976, 20, 2541-2551.
Diez-Pascual, A.M. et al., "Inorganic nanoparticle-modified poly(phenylene sulphide)/carbon fiber laminates: thermomechanical behaviour." Materials, 2013, 6, 3171-3193.

(56) References Cited

OTHER PUBLICATIONS

Lefkowiiz et al., "Influence of pH on the Reductive Transformation of Birnessite by Aqueous Mn(II)," Environmental Science & Technology, vol. 47, pp. 10364-10371, 2013.
Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.
Nohara, L.B. et al., "Study of crystallization behavior of poly(phenylene sulfide)." Polimeros: Ciencia e tecnologia, 2006, 16, 104-110.
Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.
Yu et al., "Solution-combustion synthesis of epsilo-MnO2 for supercapacitors," Materials Letters, vol. 64, pp. 61-64, Oct. 9, 2009.
Zak, A.K. et al., "Synthesis and characterization of a narrow size distribution of zinc oxide nanoparticles." International Journal of Nanomedicine, 2011, vol. 6, No. 2, pp. 1399-1403.
International Search Report and Written Opinion, dated Oct. 2, 2019 for related PCT/US2019/038190, filed on Jun. 20, 2019.
Hayashi, A. et al., "Superionic glass-ceramic electrolytes for room-temperature rechargeable sodium batteries," Nature Communications, 3:856 (May 22, 2012) 1-5.
International Application No. PCT/US2019/063562 International Search Report dated Mar. 25, 2020.
Ye, L. et al., "Polymer electrolytes as solid solvents and their applications: 14.4.2 Transference number," Polymer Electrolytes, 2010 (single page). Downloaded from https://www.sciencedirect.com/topics/chemistry/transference-number.
Ye et al., Dictionary of Weapon Industry Science and Technology Exploder, edited by Ye Ying, National Defense Industry Press, published in Dec. 1991, p. 13-134.

\* cited by examiner

BATTERY HAVING ALUMINUM ANODE AND SOLID POLYMER ELECTROLYTE

FIELD OF THE INVENTION

The present invention generally relates to an electrochemical battery including aluminum as the electrochemically active anode material, and more particularly to an aluminum battery, its component alkaline cathode and an electrolyte including a solid ionically conductive polymer material.

BACKGROUND OF THE INVENTION

Aluminum is a particularly attractive anode material because of its high theoretical voltage and specific energy. However, aluminum is a very reactive metal and participates in a corrosion side reaction (1) in aqueous systems which renders it impractical for secondary systems:

$$Al + H_2O \rightarrow Al(OH)_3 + \tfrac{3}{2} H_2 \quad (1)$$

Aluminum as an ion in an aluminum ion battery has also been researched. However, there are no practical aluminum intercalating cathodes. The aluminum ion has a low ionic conductivity in electrolytes.

Ionic liquid electrolytes, as disclosed in Nature 520, 324-328, may enable rechargeable behavior, they however are costly and yield low specific capacities for the system as $AlCl_4^-$ ions participate in the redox process as described in equation (2).

$$Al + 4AlCl_4^- + 3C_n[AlCl_4] \rightarrow 3C_n + 4Al_2Cl_7^- \quad (2)$$

For example, equation (2) results in an anode specific capacity of 114 mAh/g (Al+4 $AlCl_4^-$), while intercalation graphite cathode yields 70 mAh/g at n=32.

The present aspects and embodiments overcome the above problems that restrict aluminum from being used in a high capacity battery as well as provide additional advantages.

SUMMARY OF THE INVENTION

According to an aspect of the invention, an electrochemical battery is provided with an aluminum anode component which also comprises a solid ionically conducting polymer material.

In one aspect a battery comprises: a negative electrode comprising aluminum; a positive electrode comprising a depolarizer that is capable of electrochemically reacting to produce a hydroxide ion upon reduction; and an electrolyte comprising a solid ionically conducting polymer material interposed between the negative electrode and positive electrode to ionically conduct hydroxide ions between the electrodes.

Further aspects of the battery can include one or more of the following:

The battery wherein the cathode further comprises the solid ionically conducting polymer material.

The battery wherein the depolarizer is a metal oxide.

The battery wherein the depolarizer comprises manganese dioxide.

The battery wherein the anode further comprises an electrically conducting material.

The battery wherein the cathode further comprises an electrically conducting material.

The battery wherein the anode further comprises the solid ionically conducting polymer material, and wherein the aluminum is dispersed within the solid ionically conducting polymer material.

The battery wherein the depolarizer comprises manganese dioxide and the solid ionically conducting polymer material.

The battery wherein the solid ionically conducting polymer material comprises: a crystallinity greater than 30%; a glassy state; and both at least one cationic and anionic diffusing ion, wherein at least one diffusing ion is mobile in the glassy state.

The battery wherein the at least one anionic diffusing ion comprises hydroxide.

The battery wherein the solid ionically conducting polymer material comprises a plurality of charge transfer complexes.

The battery wherein the solid ionically conducting polymer material comprises a plurality of monomers, and wherein each charge transfer complex is positioned on a monomer.

The battery wherein the electronic conductivity of the solid ionically conducting polymer material is less than $1 \times 10^{-8}$ S/cm at room temperature.

The battery wherein the solid ionically conducting polymer material has a glassy state which exists at temperatures below the melting temperature of the solid ionically conducting polymer material.

The battery wherein the charge transfer complex is formed by the reaction of a polymer and an electron acceptor.

The battery wherein the melting temperature of the solid ionically conducting polymer material is greater than 250° C.

The battery wherein the ionic conductivity of the solid ionically conducting polymer material is greater than $1.0 \times 10^{-5}$ S/cm at room temperature.

The battery wherein the solid ionically conducting polymer material comprises a single cationic diffusing ion, wherein the diffusivity of the cationic diffusing ion is greater than $1.0 \times 10^{-12}$ m$^2$/s at room temperature.

The battery wherein the solid ionically conducting polymer material comprises a single anionic diffusing ion, wherein the diffusivity of the anionic diffusing ion is greater than $1.0 \times 10^{-12}$ m$^2$/s at room temperature.

The battery wherein at least one cationic diffusing ion comprises an alkali metal, an alkaline earth metal, a transition metal, or a post transition metal.

The battery wherein the solid ionically conducting polymer material comprises a plurality of monomers and wherein there is at least one anionic diffusing ion per monomer.

The battery wherein the solid ionically conducting polymer material comprises a plurality of monomers and wherein there is at least one cationic diffusing ion per monomer.

The battery wherein there is at least one mole of the cationic diffusing ion per liter of solid ionically conducting polymer material.

The battery wherein the solid ionically conducting polymer material is formed by the reaction of a polymer, electron acceptor, and an ionic compound.

The battery wherein the solid ionically conducting polymer material is formed from at least one ionic compound, wherein the ionic compound comprises each at least one cationic and anionic diffusing ion.

The battery wherein the solid ionically conducting polymer material is a thermoplastic.

The battery wherein each at least one cationic and anionic diffusing ion have a diffusivity, wherein the anionic diffusivity is greater than the cationic diffusivity.

The battery wherein the diffusing cation is monovalent.

The battery wherein both the at least one diffusing anion and the diffusing cation are monovalent.

The battery wherein the cationic transference number of the solid ionically conducting polymer material is equal to or less than 0.5, and greater than zero.

The battery wherein one of the at least cationic diffusing ion, has a diffusivity greater than $1.0 \times 10^{-12}$ m$^2$/s.

The battery wherein one of the at least one anionic diffusing ion has a diffusivity greater than $1.0 \times 10^{-12}$ m$^2$/s.

The battery wherein one of both the at least one anionic diffusing ion and at least one cationic diffusing ion has a diffusivity greater than $1.0 \times 10^{-12}$ m$^2$/s.

The battery wherein the solid ionically conducting polymer material comprises a plurality of monomers, wherein each monomer comprises an aromatic or heterocyclic ring structure positioned in the backbone of the monomer.

The battery wherein the solid ionically conducting polymer material further includes a heteroatom incorporated in the ring structure or positioned on the backbone adjacent the ring structure.

The battery wherein the heteroatom is selected from the group consisting of sulfur, oxygen or nitrogen.

The battery wherein the heteroatom is positioned on the backbone of the monomer adjacent the ring structure.

The battery wherein the heteroatom is sulfur.

The battery wherein the solid ionically conducting polymer material is pi-conjugated. The battery wherein the solid ionically conducting polymer material comprises a plurality of monomers, wherein the molecular weight of each monomer is greater than 100 grams/mole.

The battery wherein the solid ionically conducting polymer material is hydrophilic. The battery wherein the ionic conductivity of the solid ionically conducting polymer material is isotropic.

The battery wherein the solid ionically conducting polymer material has an ionic conductivity greater than $1 \times 10^{-4}$ S/cm at room temperature.

The battery wherein the solid ionically conducting polymer material has an ionic conductivity greater than $1 \times 10^{-3}$ S/cm at 80° C.

The battery wherein the solid ionically conducting polymer material has an ionic conductivity greater than $1 \times 10^{-5}$ S/cm at −40° C.

The battery wherein the diffusivity of the hydroxide ion is greater than $1.0 \times 10^{-13}$ m$^2$/s at room temperature.

The battery wherein the solid ionically conducting polymer material is non-flammable.

The battery wherein the Young's modulus of the solid ionically conducting polymer material is equal to or greater than 3.0 MPa.

The battery wherein the solid ionically conducting polymer material becomes ionically conductive after being doped by an electron acceptor in the presence of an ionic compound that either contains both a cationic and anionic diffusing ion or is convertible into both the cationic and anionic diffusing ion via reaction with the electron acceptor.

The battery wherein the solid ionically conducting polymer material is formed from the reaction product of a base polymer, electron acceptor and an ionic compound.

The battery wherein the base polymer is a conjugated polymer.

The battery wherein the base polymer is PPS or a liquid crystal polymer.

The battery wherein the aluminum is mixed with the solid ionically conducting polymer material and wherein the anode is thermoplastic.

The battery wherein the depolarizer comprises manganese dioxide, and the manganese dioxide is selected from a group comprising β-MnO2 (pyrolusite), ramsdellite, γ-MnO2, ε-MnO2, λ-MnO2, EMD, CMD, and combinations thereof.

The base polymer is PPS, PEEK, LCP, PPy, or a combination thereof;

The dopant is selected from DDQ, TCNE, chloranil, SO3, ozone, a transition metal oxide, MnO2, oxygen and air;

The ionic compound is a salt, hydroxide, oxide or other material containing hydroxide ions or convertible to hydroxide; The ionic compound comprises LiOH, NaOH, or KOH;

These and other features, advantages, and objects will be further understood and appreciated by those skilled in the art by reference to the following specification, claims, and appended drawings.

DETAILED DESCRIPTION OF THE PREFERRED EMBODIMENTS

This application claims the benefit of U.S. Provisional Patent Application No. 62/172,467 filed Jun. 8, 2015 incorporated herein by reference; and also incorporates by reference U.S. Provisional Patent Application No. 62/158,841 filed May 8, 2015; U.S. patent application Ser. No. 14/559,430 filed Dec. 3, 2014; U.S. Provisional Patent Application No. 61/911,049 filed Dec. 3, 2013; U.S. patent application Ser. No. 13/861,170 filed Apr. 11, 2013; and U.S. Provisional Patent Application No. 61/622,705 filed Apr. 11, 2012.

Figure 1:
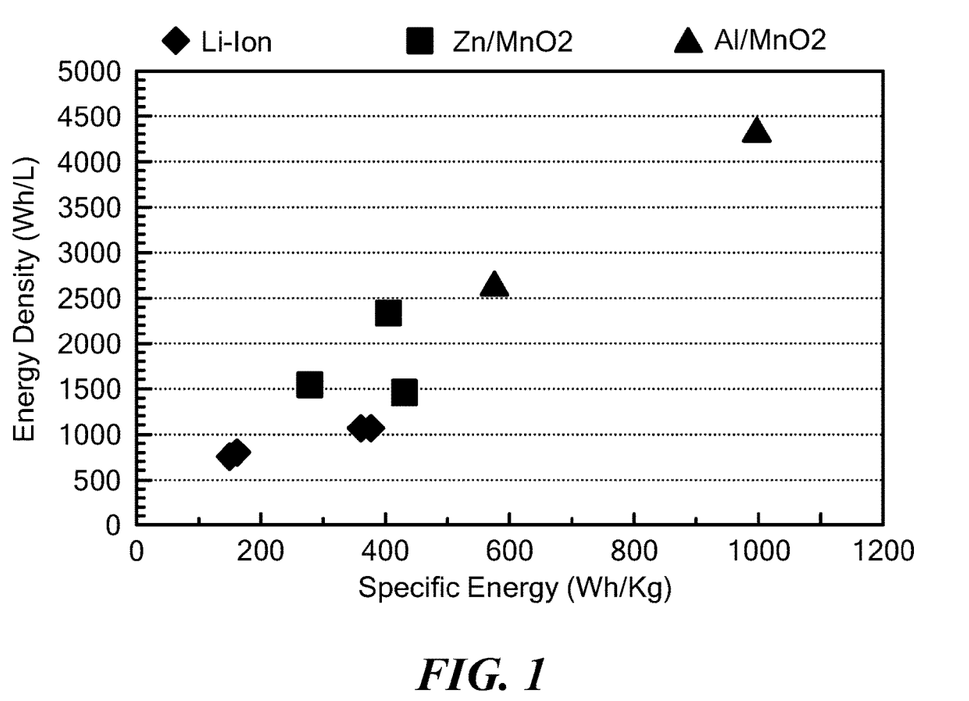
FIG. 1 is an energy density curve comparing the energy density of an aspect to other electrochemical systems.

In an aspect, electrochemically active aluminum particles are incorporated into a solid ionically conductive polymer material allows for increasing specific capacity of the active material to the levels close to their respective theoretical discharge. Coupling a 2e-MnO$_2$ cathode with aluminum anode further increases the energy density, ideally resulting in high volumetric performance in a rechargeable battery. Referring to FIG. 1, the energy density of this aspect is compared to other electrochemical systems. Such a secondary battery benefits from both cathode and anode material being abundant, inexpensive and environmentally benign.

The anode electrochemical reaction is set forth in equation (3):

$$Al + 3O^- \rightarrow Al(OH)_3 + 3e^- \qquad (3)$$

In an aspect where MnO$_2$ used as the cathode depolarizer, the cathode electrochemical reaction is set forth in equation (4):

$$MnO_2 + H_2O + e^- \rightarrow MnOOH^- \quad (4)$$

Thus the manganese dioxide produces a hydroxide ion when it is reduced to the oxyhydroxide. In another aspect the cathode can comprise an alternative depolarizer (e.g. metal oxide) that is capable of electrochemically reacting to produce hydroxide ions upon reduction.

Figure 2:
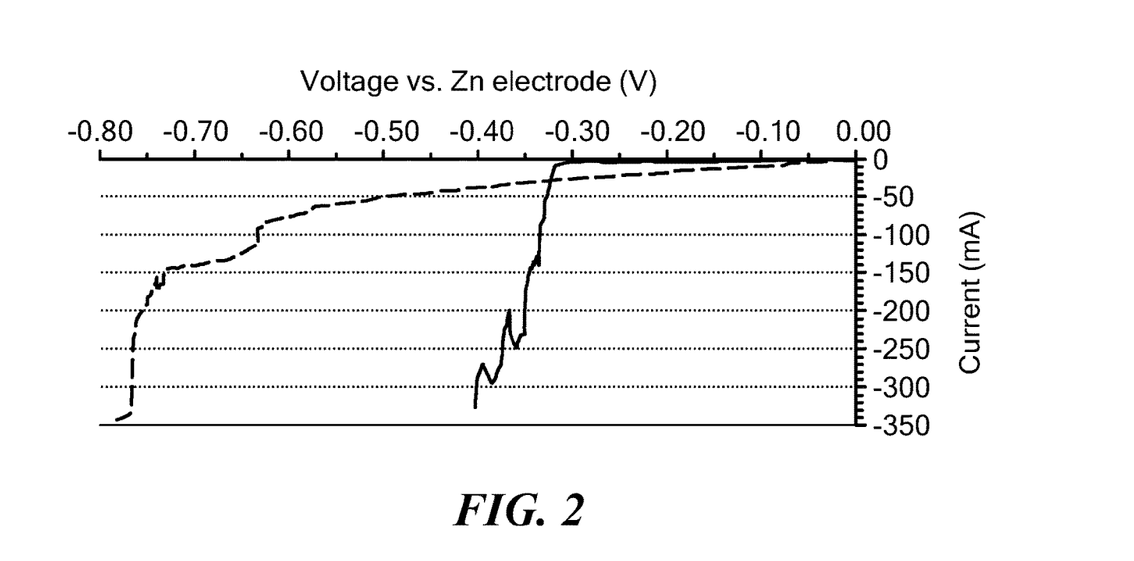
FIG. 2 is a potentiodynamic curve of aluminum foil and an aluminum electrode dispersed in the solid ionically conductive polymer material in a NaOH-based electrolyte recorded at 1 mV/s scan rate.

Theoretically, aluminum discharges at a voltage about 0.9 V more negative compared to Zn, resulting more than double specific energy (Wh/Kg) and almost double energy density (Wh/L) when both anodes are against MnO$_2$ cathodes. However, in aqueous alkaline solutions, aluminum is not stable undergoing more severe corrosion than Zn. Electrodes with aluminum powder dispersed in the herein described solid ionically conductive polymer material display corrosion at more negative voltages than aluminum foil anode. Referring to FIG. 2., there is shown a potentiodynamic curve of aluminum foil and an aluminum electrode dispersed in the solid ionically conductive polymer material in a NaOH-based electrolyte recorded at 1 mV/s scan rate.

Figure 3:
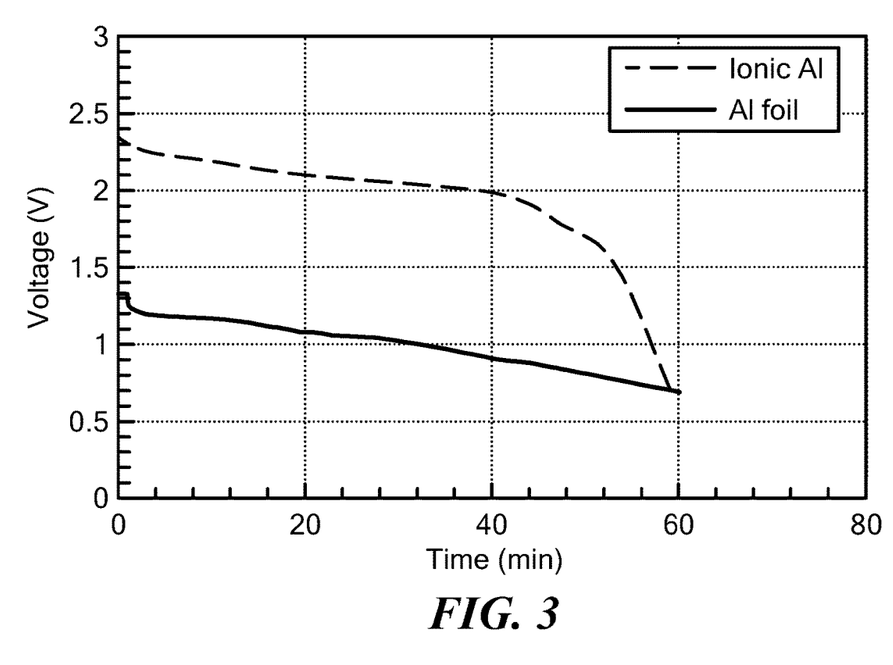
FIG. 3 shows discharge curves of a dispersed Al anode versus an Al foil anode, both with MnO$_2$ cathodes as counter electrodes.

Dispersing fine aluminum powder in the solid ionically conductive polymer material increases aluminum surface area, thus reduces effective current density to mitigate surface passivation. Cells with the dispersed aluminum anode and an MnO$_2$ cathode demonstrated comparable discharge capacity to Al foil. Referring to FIG. 3, there are shown discharge curves of the dispersed Al anode versus an Al foil anode, both with MnO$_2$ cathodes as countering electrodes. The discharging voltage is about 1 V higher in the battery with the dispersed aluminum, than Al foil, which means doubled energy density considering other components are the same.

Figure 4:
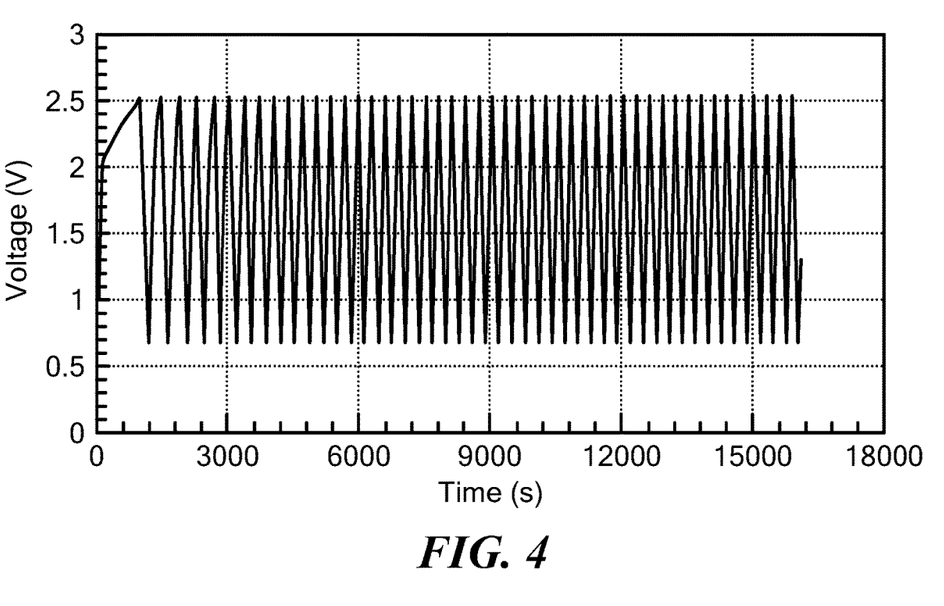
FIG. 4 is a charge/discharge curve of a cell with the dispersed aluminum anode and MnO$_2$ cathode at a 0.5 mA discharge current over fifty (50) repetitive charge/discharge cycles.

These cells display typical charge/discharge behavior. Referring to FIG. 4, there is shown a charge/discharge curve of a cell with the dispersed aluminum anode and MnO$_2$ cathode at a 0.5 mA discharge current. The cell displayed fifty (50) repetitive charge/discharge cycles, demonstrating rechargeability of this aspect.

The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material. When an electrode has more than one electroactive substances they can be referred to as codepolarizers.

Thermoplastic is a characteristic of a plastic material or polymer to become pliable or moldable above a specific temperature often around or at its melting temperature and to solidify upon cooling.

Solid electrolytes include solvent free polymers, and ceramic compounds (crystalline and glasses).

A "Solid" is characterized by the ability to keep its shape over an indefinitely long period, and is distinguished and different from a material in a liquid phase. The atomic structure of solids can be either crystalline or amorphous. Solids can be mixed with or be components in composite structures.

For purposes of this application and its claims, a solid ionically conducting polymer material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes (solid ionically conducting polymer material) in that they rely on a liquid phase for their ionic conductivity.

A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1 \times 10^{-14}$ m²/s and preferably at least $1 \times 10^{-13}$ m²/s, which both communicate an ion is mobile in a material.

A solid polymer ionically conducting material is a solid that comprises a polymer and that conducts ions as will be further described.

An aspect includes a method of synthesizing a solid ionically conducting polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesize the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conducting polymer material in a single step. However, this heating step can be done when in a separate step from any mixing or can completed while mixing is being done. The heating step can be performed regardless of the form of the mixture (e.g. film, particulate, etc.). In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of film containing the base polymer and ionic compound and other doping methods known to those skilled in the art. Upon doping the solid polymer material becomes ionically conductive, and it is believed that the doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conducting polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{1-20}$ S cm$^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Copolymers including monomers of the listed polymers and mixtures of these polymers may also be used. For example, copolymers of p-hydroxybenzoic acid can be appropriate liquid crystal polymer base polymers.

Table 1 details non-limiting examples of reactant polymers useful in the synthesis of the solid ionically conducting polymer material along with monomer structure and some physical property information which should be considered also non-limiting as polymers can take multiple forms which can affect their physical properties.

TABLE 1

| Polymer | Monomer Structure | Melting Pt. (C.) | MW |
|---|---|---|---|
| PPS polyphenylene sulfide | | 285 | 109 |
| PPO Poly(p-phenylene oxide) | | 262 | 92 |
| PEEK Polyether ether ketone | | 335 | 288 |
| PPA Polyphthalamide | | 312 | |
| Polypyrrole | | | |
| Polyaniline Poly-Phenylamine $[C_6H_4NH]_n$ | | 385 | 442 |
| Polysulfone | | | 240 |
| Xydar (LCP) | | | |
| Vectran Poly-paraphenylene terephthalamide $[-CO-C_6H_4-CO-NH-C_6H_4-NH-]_n$ | | | |
| Polyvinylidene fluoride (PVDF) | | 177 | |

TABLE 1-continued

| Polymer | Monomer Structure | Melting Pt. (C.) | MW |
|---|---|---|---|
| Polyacrylonitrile (PAN) | | | 300 |
| Polytetrafluoro-ethylene (PTFE) | | | 327 |
| Polyethylene (PE) | | 115-135 | |

Dopants that are useful as reactants in the synthesis of the solid ionically conducting polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur trioxide ("$SO_3$"), ozone (trioxygen or $O_3$), oxygen ($O_2$, including air), transition metal oxides including manganese dioxide ("$MnO_2$"), or any suitable electron acceptor, etc. and combinations thereof. Dopants that are temperature stable at the temperatures of the synthesis heating step are useful, and quinones and other dopants which are both temperature stable and strong oxidizers quinones are very useful. Table 2 provides a non-limiting listing of dopants, along with their chemical diagrams.

TABLE 2

| Dopant | Formula | Structure |
|---|---|---|
| 2,3-Dichloro-5,6-dicyano-1,4-benzoquinone (DDQ) | $C_6Cl_2(CN)_2O_2$ | |
| tetrachloro-1,4-benzoquinone (chloranil) | $C_6Cl_4O_2$ | |
| Tetracyanoethylene (TCNE) | $C_6N_4$ | |

TABLE 2-continued

| Dopant | Formula | Structure |
|---|---|---|
| Sulfur Trioxide | $SO_3$ | |
| Ozone | $O_3$ | |
| Oxygen | $O_2$ | |
| Transition Metal Oxides | $M_xO_y$, (M = Transition Metal, x and y are equal to or greater than 1) | |

Ionic compounds that are useful as reactants in the synthesis of the solid ionically conducting polymer material are compounds that release desired ions during the synthesis of the solid ionically conducting polymer material. The ionic compound is distinct from the dopant in that both an ionic compound and a dopant are required. Non-limiting examples include $Li_2O$, LiOH, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl)imide), Lithium bis(oxalato)borate ($LiB(C_2O_4)_2$ "LiBOB") and other lithium salts and combinations thereof. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred. The particular ionic compound included in the synthesis depends on the utility desired for the material. For example, in an application where it would be desired to have a hydroxide anion, a lithium hydroxide, or an oxide convertible to a hydroxide ion would be appropriate. As would be any hydroxide containing compound that releases a diffusing hydroxide anion during synthesis. A non-limiting group of such hydroxide ionic compounds includes metal hydroxides. The hydroxide ionic compounds can include alkaline metals, alkaline earth metals, transition metals, and post transition metals in a form that can produce both the desired cationic and anionic diffusing species are appropriate as synthesis reactant ionic compounds.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are useful, and purities greater than 98% are more useful with even higher purities, e.g. LiOH: 99.6%, DDQ: >98%, and Chloranil: >99% also useful. Impurities in Aluminum powder can produce undesired corrosion reactions, therefore relative pure aluminum is desired such as 5N purity powder.

Using certain aluminum alloys instead of pure aluminum powder and utilizing electrolyte additives, such as MgO, $Na_2SnO_3$ and others may be used in an aspect of the aluminum anode. Further optimization may include incorporating desired additives into the anode structure (intermixing with aluminum or alloy powder). 2000, 5000 and 7000 series alloys and other alloy or dopant elements such as Gallium, Magnesium, Manganese, Copper, Zinc, Cadmium, Tin, Indium, Barium and combinations thereof may be useful to maintain stability of the aluminum alloy. In an aspect, the aluminum is alloyed with zinc, tin, gallium, magnesium or a combination of two or more of the elements.

In addition to alloying, particle size can be varied, zinc oxide can be mixed in to reduce corrosion rate, and other functional additives can be added to promote plating and reduce agglomeration and dendrite formation e.g. phosphates, potassium fluoride, calcium hydroxide, titanium nitride, etc.

The aluminum is dispersed within the solid ionically conductive polymer material, by being mixed with it. Additional electrically conductive material can be added to the anode and dispersed/mixed with the aluminum and solid ionically conductive polymer material. Graphites, carbons, aluminum flake, and bimodal distributions of aluminum powder can be used to increase the electrical conductivity of the anode.

In an aspect, the cathode comprises manganese dioxide. Specifically, the cathodes electrochemically active cathode material can be added in the form of $\beta$-$MnO_2$ (pyrolusite), ramsdellite, $\gamma$-$MnO_2$, $\epsilon$-$MnO_2$, $MnO_2$ and other $MnO_2$ phases or mixtures thereof, including, but not limited to, EMD and CMD.

In an alternative aspect, other alkaline battery cathode materials that produce hydroxide ion upon reduction can be useful. Silver oxide and silver dioxide, other metal oxides and metal oxyhydroxides (e.g. NiOOH) are also useful to produce the hydroxide ion upon electrochemical reduction.

The solid ionically conductive polymer electrolyte can be mixed with the electrochemically active cathode material and an electrical conductive material. Graphite, carbons and other electrically conductive materials typical of alkaline cathodes are useful to maintain a requisite electrical conductivity. Aqueous electrolyte can also be added to the cathode and can be sealed relative the anode by the solid ionically conductive polymer electrolyte interposed between the anode and cathode. Potassium, and sodium hydroxide are suitable aqueous electrolytes.

The electrolyte can comprise solid ionically conductive polymer in an aspect and can be thermoformed or extruded into a film that is interposed between the anode and cathode. The solid ionically conductive polymer electrolyte acts to ionically conduct the hydroxide ion to and from the cathode. Thus the solid ionically conductive polymer electrolyte need to provide an ionic pathway between the anode and cathode's electrochemically active materials.

As the electrolyte, anode and cathode can all comprise the solid ionically conductive polymer electrolyte, each battery component can be thermoformed as the solid ionically conductive polymer electrolyte is a thermoplastic. The battery components can be adhered to each other by heating, or can be co-extruded.

To further describe the utility of the solid ionically conducting polymer material and the versatility of the above described method of the synthesis of the solid ionically conducting polymer material, several classes of the solid ionically conducting polymer material useful for multiple electrochemical applications and distinguished by their application are described:

Example 1

The solid ionically conductive polymer material is synthesized in two aspects to describe how the material can be used in different aspects of the battery design:

Example 1A

PPS polymer was mixed with the ionic compound LiOH monohydrate in the proportion of about 10-40% (by wt.) of the metal hydroxide, respectively, and mixed using jet milling. This undoped mixture is heated between 320-380° C. and extruded into a 10-15 micrometer thick film. The extruded film was then annealed at 150° C. for about two hours to increase the crystallinity of the mixed PPS polymer. Chloranil dopant was added via vapor doping to the resulting mixture at a temperature between 190-200° C. for 1-16 hours in a tube furnace under vacuum to synthesize a solid ionically conducting polymer material (PPS/LiOH/Chloranil). The synthesized material undergoes a color change during doping indicating that the chemical reaction takes place, and indicating the formation of the solid ionically conductive polymer material.

Example 1B

In an aspect, the solid ionically conducting polymer material (PPS/LiOH/DDQ) is synthesized in a particulate form by first mixing the DDQ dopant and base polymer PPS in a ratio of one mole DDQ per 4.2 moles of PPS monomer. and heated between 250 and 325° C. to create a particulate form. Ionic LiOH is mixed to the particular form to create the solid ionically conducting polymer material.

Electronic conductivity of the materials in both Example 1A and 1B was measured using the potentiostatic method between blocking electrodes, and was determined to be about $6.5 \times 10^{-9}$ S/cm (less than or less conductive than $1 \times 10^{-8}$ S/cm).

Ionic diffusivity measurements were conducted on a compression molded particulate form of the PPS/LiOH/DDQ material using fundamental NMR techniques. Specifically, the diffusivity of lithium and hydroxide ions was evaluated by a pulsed gradient spin echo ("PGSE") lithium NMR method. The PGSE-NMR measurements were made using a Varian-S Direct Drive 300 (7.1 T) spectrometer. The solid polymer ionically conducting material, has a $Li^+$ diffusivity of $5.7 \times 10^{-11}$ m$^2$/s at room temperature, and the diffusivity of the OH$^-$ ion was $4.1 \times 10^{-11}$ m$^2$/s at room temperature. These diffusivity values can be used to calculate both an anionic and cationic transference number. Although related, the anionic transference number is more relevant in that the diffusivity of the hydroxide is important in alkaline batteries.

Example 2

A cathode is made by mixing the solid ionically conductive polymer material prepared in Example 1B with electrically conductive carbon powder, EMD, a binder (PVDF or Kraton with DMA or NMP as a solvent) in desired proportion and slurry-casted onto an electrically conducting (e.g. metal, titanium or stainless steel which has a thin layer of graphite primer to reduce collector to cathode resistance) current collector. The cathode was then dried at 80-120° C. for 2-12 hours, calendared and sliced into desired dimensions for coin cells or pouch cell.

Example 3

Aluminum powder (ultra-pure powder or alloy powder) mixed with solid ionically conducting polymer material from Example 1B, conductive carbon, additives such as zinc oxide and/or other corrosion-resistive additives. PVDF or Kraton is used as binder, with DMA or NMP as solvent. Mixed slurry is then casted onto a titanium or stainless steel current collector, which has a thin layer of graphite primer. Electrodes were then dried at 80-120° C. for 2-12 hours, calendared and sliced into desired dimensions for coin cells or pouch cells.

The solid ionically conducting polymer material retains the thermoplastic physical properties of its base polymer. For example, it is capable of being thermoformed, extruded or otherwise shaped into a myriad of webs, annulus, powders, meshes, convolutes, coatings, films, and other useful forms. As the electrode materials are encapsulated by the solid ionically conducting polymer material the electrodes are also thermoplastic as they can be molded while maintaining this encapsulation. This property of solid ionically conducting polymer material is particularly useful in a battery in that electrode can be molded into plurality of shapes.

Different types of cells have been constructed using the above anode, cathode and polymer electrolyte films, including 2032-type coin cells, pouch cells and bipolar pouch cells. In a typical cell, layers of cathode, polymer electrolyte and anode are stacked from bottom to top, and sealed for testing.

Example 4

Batteries were assembled from the components described in Examples 2 and 3. NaOH solution containing additives was used as electrolyte. A non-woven separator from Nippon Kodoshi Corporation (VLS55L200) was used. The discharge voltage was about IV higher compared to Al foil anode (other components being the same), as shown in FIG. 3.

Example 5

Batteries were assembled from the components described in Examples 1-3. With the solid ionically conducting polymer material from Example 1A shaped into a film of 15 micrometers and interposed as an electrolyte between the anode from Example 3 and cathode from Example 2, an Aluminum-$MnO_2$ battery was constructed and tested. The battery displayedtypical charge-discharge behavior as shown in FIG. 4.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein. It is to be understood that variations and modifications can be made on the aforementioned structure without departing from the concepts of the describe aspects, and further it is to be understood that such concepts are intended to be covered by the following claims unless these claims by their language expressly state otherwise.

What is claimed is:

1. A battery comprising:
 a negative electrode comprising a dispersed aluminum powder and a solid ionically conducting polymer, wherein the dispersed aluminum powder is dispersed within the solid ionically conducting polymer;
 a positive electrode comprising a depolarizer that is capable of electrochemically reacting to produce a hydroxide ion upon reduction; and
 an electrolyte interposed between the negative electrode and positive electrode to ionically conduct hydroxide ions between the electrodes;
 wherein the electrolyte further comprises the solid ionically conducting polymer;
 wherein an ionic conductivity of the solid ionically conducting polymer is greater than $1.0 \times 10^{-5}$ S/cm at room temperature of 21° C.; and
 wherein the solid ionically conducting polymer is ionically conductive through the solid and not through any solvent, gel or liquid phase.

2. The battery of claim 1, wherein the positive electrode further comprises the solid ionically conducting polymer.

3. The battery of claim 1, wherein the depolarizer is a metal oxide.

4. The battery of claim 1, wherein the depolarizer comprises manganese dioxide.

5. The battery of claim 1, wherein the negative electrode further comprises an electrically conducting material in addition to aluminum.

6. The battery of claim 1, wherein the positive electrode further comprises an electrically conducting material.

7. The battery of claim 1, wherein the depolarizer comprises manganese dioxide and the solid ionically conducting polymer.

8. The battery of claim 1, wherein the solid ionically conducting polymer comprises:
 a crystallinity greater than 30%;
 a glassy state;
 and both at least one cationic diffusing ion and at least one anionic diffusing ion;
 wherein at least one of the at least one cationic diffusing ion and the at least one anionic diffusing ion is mobile in the glassy state.

9. The battery of claim 8, wherein the at least one anionic diffusing ion comprises hydroxide.

10. The battery of claim 1, wherein the solid ionically conducting polymer comprises a plurality of charge transfer complexes.

11. The battery of claim 10,
 wherein the solid ionically conducting polymer comprises a plurality of monomers; and wherein each of the plurality of charge transfer complexes is positioned on a monomer.

12. The battery of claim 1, wherein the electronic conductivity of the solid ionically conducting polymer is less than $1 \times 10^{-8}$ S/cm at room temperature.

13. The battery of claim 5, wherein the solid ionically conducting polymer has a glassy state which exists at temperatures below the melting temperature of the solid ionically conducting polymer.

14. The battery of claim 10, wherein each of the plurality of charge transfer complexes is formed by the reaction of a base polymer and an electron acceptor.

15. The battery of claim 1, wherein the melting temperature of the solid ionically conducting polymer is greater than 250° C.

16. The battery of claim 8, wherein at least one of the at least one cationic diffusing ion has a diffusivity of greater than $1.0 \times 10^{-12}$ m$^2$/s at room temperature.

17. The battery of claim 8, wherein at least one of the at least one anionic diffusing ion has a diffusivity of greater than $1.0 \times 10^{-12}$ m$^2$/s at room temperature.

18. The battery of claim 8, wherein the at least one cationic diffusing ion is selected from the group consisting of an alkali metal, an alkaline earth metal, a transition metal, and a post transition metal.

19. The battery of claim 1, wherein the solid ionically conducting polymer comprises a plurality of monomers and wherein there is at least one anionic diffusing ion per monomer.

20. The battery of claim 1, wherein the solid ionically conducting polymer comprises a plurality of monomers and wherein there is at least one cationic diffusing ion per monomer.

21. The battery of claim 1, wherein there is at least one mole of a cationic diffusing ion per liter of solid ionically conducting polymer.

22. The battery of claim 1, wherein the solid ionically conducting polymer is formed by a reaction of a base polymer, an electron acceptor, and an ionic compound.

23. The battery of claim 1,
wherein the solid ionically conducting polymer is formed from at least one ionic compound; and
wherein the ionic compound comprises at least one cationic diffusing ion and at least one anionic diffusing ion.

24. The battery of claim 1, wherein the solid ionically conducting polymer is a thermoplastic.

25. The battery of claim 23,
wherein each of the at least one cationic diffusing ion has a cationic diffusivity and the at least one anionic diffusing ion has an anionic diffusivity; and
wherein the anionic diffusivity is greater than the cationic diffusivity.

26. The battery of claim 23, wherein at least one of the at least one cationic diffusing ion is monovalent.

27. The battery of claim 23, wherein both the at least one cationic diffusing ion and the at least one anionic diffusing ion are monovalent.

28. The battery of claim 23, wherein the solid ionically conducting polymer material has a cationic transference number which is equal to or less than 0.5, and greater than zero; wherein cationic transference number is calculated based on diffusivity values of the solid ionically conducting polymer as measured using fundamental NMR techniques.

29. The battery of claim 23, wherein at least one of the at least one cationic diffusing ion has a diffusivity of greater than $1.0 \times 10^{-12}$ m$^2$/s.

30. The battery of claim 23, wherein at least one of the at least one anionic diffusing ion has a diffusivity of greater than $1.0 \times 10^{-12}$ m$^2$/s.

31. The battery of claim 23, wherein at least one of both the at least one anionic diffusing ion and the at least one cationic diffusing ion has a diffusivity greater than $1.0 \times 10^{-12}$ m$^2$/s.

32. The battery of claim 1,
wherein the solid ionically conducting polymer comprises a plurality of monomers; and
wherein each of the plurality of monomers comprises an aromatic or heterocyclic ring structure positioned in a backbone of the monomer.

33. The battery of claim 32, wherein the solid ionically conducting polymer further includes a heteroatom incorporated in the ring structure or positioned on the backbone adjacent the ring structure.

34. The battery of claim 33, wherein the heteroatom is selected from the group consisting of sulfur, oxygen, and nitrogen.

35. The battery of claim 34, wherein the heteroatom is positioned on the backbone of the monomer adjacent the ring structure.

36. The battery of claim 35, wherein the heteroatom is sulfur.

37. The battery of claim 1, wherein the solid ionically conducting polymer is pi-conjugated.

38. The battery of claim 1,
wherein the solid ionically conducting polymer comprises a plurality of monomers and
wherein each of the plurality of monomer has a molecular weight of greater than 100 grams/mole.

39. The battery of claim 1, wherein the solid ionically conducting polymer is hydrophilic.

40. The battery of claim 1, wherein the ionic conductivity of the solid ionically conducting polymer is isotropic.

41. The battery of claim 1, wherein the ionic conductivity is greater than $1 \times 10^{-4}$ S/cm at room temperature.

42. The battery of claim 1, wherein the ionic conductivity is greater than $1 \times 10^{-3}$ S/cm at 80° C.

43. The battery of claim 1, wherein the ionic conductivity is greater than $1 \times 10^{-5}$ S/cm at −40° C.

44. The battery of claim 1, wherein hydroxide ions have a diffusivity of greater than $1.0 \times 10^{-13}$ m$^2$/s through the electrolyte at room temperature.

45. The battery of claim 1, wherein the solid ionically conducting polymer is non-flammable.

46. The battery of claim 1, wherein the Young's modulus of the solid ionically conducting polymer is equal to or greater than 3.0 MPa.

47. The battery of claim 1,
wherein the solid ionically conducting polymer is formed by a base polymer being doped by an electron acceptor in the presence of an ionic compound; and
wherein the ionic compound either contains both a cationic diffusing ion and an anionic diffusing ion or is convertible into both the cationic diffusing ion and the anionic diffusing ion via reaction with the electron acceptor.

48. The battery of claim 47, wherein the base polymer is a conjugated polymer.

49. The battery of claim 47, wherein the base polymer is PPS or a liquid crystal polymer.

50. The battery of claim 1,
wherein the dispersed aluminum powder is mixed with the solid ionically conducting polymer; and
wherein the solid ionically conducting polymer is thermoplastic.

51. The battery of claim 1,
wherein the depolarizer comprises manganese dioxide; and
the manganese dioxide is selected from a group consisting of $\beta$-$MnO_2$ (pyrolusite), ramsdellite, $\gamma$-$MnO_2$, $\varepsilon$-$MnO_2$, —$MnO_2$, EMD, CMD, and at least two of the aforementioned.

52. The battery of claim 10, wherein the solid ionically conducting polymer has an electronic conductivity of less than $1\times10^{-8}$ S/cm at room temperature.

* * * * *